US011859079B2

(12) United States Patent
Clarke et al.

(10) Patent No.: US 11,859,079 B2
(45) Date of Patent: Jan. 2, 2024

(54) GLYCEROL-BASED EPOXY RESINS

(71) Applicant: STEED MIFSUD PTY LTD, Thebarton (AU)

(72) Inventors: Stephen Ross Clarke, Thebarton (AU); Joseph Adrian Mifsud, Thebarton (AU); Neil Alan Trout, Thebarton (AU)

(73) Assignee: STEED MIFSUD PTY LTD, Thebarton (AU)

( * ) Notice: Subject to any disclaimer, the term of this patent is extended or adjusted under 35 U.S.C. 154(b) by 0 days.

(21) Appl. No.: 17/651,728

(22) Filed: Feb. 18, 2022

(65) Prior Publication Data

US 2022/0169845 A1    Jun. 2, 2022

Related U.S. Application Data

(63) Continuation of application No. 16/310,080, filed as application No. PCT/AU2017/050598 on Jun. 15, 2017, now abandoned.

(30) Foreign Application Priority Data

Jun. 15, 2016    (AU) .............................. 2016902323

(51) Int. Cl.
| *C08L 63/00* | (2006.01) |
| *C08G 59/02* | (2006.01) |
| *C08G 59/18* | (2006.01) |
| *C08G 59/22* | (2006.01) |
| *C08G 59/32* | (2006.01) |
| *C08G 59/50* | (2006.01) |

(52) U.S. Cl.
CPC .............. *C08L 63/00* (2013.01); *C08G 59/02* (2013.01); *C08G 59/182* (2013.01); *C08G 59/22* (2013.01); *C08G 59/32* (2013.01); *C08G 59/50* (2013.01); *C08G 59/5026* (2013.01)

(58) Field of Classification Search
None
See application file for complete search history.

(56) References Cited

U.S. PATENT DOCUMENTS

| 2,633,458 | A | * | 3/1953 | Shokal | .................... | C08G 59/66 |
| | | | | | | 528/109 |
| 3,538,039 | A | * | 11/1970 | Lantz | ...................... | C08G 59/10 |
| | | | | | | 524/904 |
| 2009/0011244 | A1 | | 1/2009 | Kishikawa et al. | | |
| 2015/0011680 | A1 | | 1/2015 | Habas et al. | | |
| 2015/0203627 | A1 | * | 7/2015 | Sisson | ........................ | C08J 9/26 |
| | | | | | | 522/31 |
| 2017/0355810 | A1 | | 12/2017 | Langkabel et al. | | |

FOREIGN PATENT DOCUMENTS

| CN | 101296875 | A | | 10/2008 | | |
| CN | 102625815 | A | | 8/2012 | | |
| EP | 496163 | A1 | * | 7/1992 | ............. | C08G 59/10 |
| EP | 3255079 | A1 | | 12/2017 | | |
| WO | WO-2011024014 | A1 | | 3/2011 | | |
| WO | WO-2014027090 | A2 | * | 2/2014 | ............. | C08G 59/32 |
| WO | WO-2016030279 | A1 | | 3/2016 | | |

OTHER PUBLICATIONS

International Search Report and Written Opinion for International Application No. PCT/AU2017/050598, dated Aug. 24, 2017.
Kasetaite, S. et al., "Photocross-linking of Glycerol Diglycidyl Ether with Reactive Diluents", Polym. Bull., 2015, vol. 72, pp. 3191-3208.
Shibata, M. et al., "Preparation and Properties of Biocomposites Composed of Glycerol-Based Epoxy Resins, Tannic Acid, and Wood Flour," Journal of Applied Polymer Science, 2010, vol. 118, pp. 2998-3004.
Omrani, A. et al., "Curing Behavior and Structure of a Novel Nanocomposite from Glycerol Diglycidyl Ether and 3,3-Dimethylglutaric anhydride", Thermochimica Acta, 2011, vol. 517, pp. 9-15.
Report of the First Office Action issued to Application No. 201780043726.5 to China, dated Feb. 19, 2021.
First Examination Report for Application No. 2017285476 in Australia, dated Feb. 12, 2021.
Photocross-linking of glycerol diglycidyl ether with reactive diluents, Sigita Kasetaite, et al., Polym. Bull., vol. 72, No. 12 pp. 3191-3208, published on Jul. 18, 2015.
Examination Report, issued to EP 17812316.2, dated Sep. 8, 2021.
Examination Report, issued in application No. PI2018002556, Intellectual Property Corporation of Malaysia, dated Aug. 12, 2021.
Search Report, issued in application No. PI2018002556, Intellectual Property Corporation of Malaysia, dated Aug. 12, 2021.

(Continued)

*Primary Examiner* — Randy P Gulakowski
*Assistant Examiner* — Ha S Nguyen
(74) *Attorney, Agent, or Firm* — MARSHALL, GERSTEIN & BORUN LLP

(57) ABSTRACT

An aliphatic epoxy resin precursor composition containing an epoxy component and, optionally, a reactive component, the composition containing no phenols, wherein the epoxy component is a glycerol-based ether, and wherein the precursor composition contains greater than about 60% (w/w) of the epoxy component and between 0% and 30% (w/w) of the reactive component. A cured aliphatic epoxy resin containing a precursor composition and a curing component, the precursor composition including an epoxy component and, optionally, a reactive component, and the cured resin containing no phenols, wherein the epoxy component is a glycerol-based ether, and wherein the precursor composition contains greater than about 60% (w/w) of the epoxy component and between 0% and 30% (w/w) of the reactive component.

17 Claims, No Drawings

(56) References Cited

OTHER PUBLICATIONS

Second Office Action and Supplemental Search Report, issued in application No. CN201780043726.5 issued by China National Intellectual Property Administration, dated Nov. 25, 2021.
Wang et al., "Study of fulleme-containing epoxy membranes with tunable ultraviolet-filtering properties," Progress in Organic Coatings, vol. 67, pp. 398-404, (2010).
First Examination Report for Application No. 2022200977 in Australia dated Mar. 23, 2023.

* cited by examiner

GLYCEROL-BASED EPOXY RESINS

CROSS-REFERENCE TO RELATED APPLICATIONS

This is a continuation of U.S. patent application Ser. No. 16/310,080, filed 14 Dec. 2018, which is the United States national phase of International Patent Application No. PCT/AU2017/050598, filed 15 Jun. 2017, which claims priority to Australian provisional patent application No. 2016902323, filed 15 Jun. 2016, the entire contents of each of the foregoing being hereby incorporated by reference herein.

FIELD OF THE INVENTION

The present invention relates to epoxy resins that do not contain phenols, and that more specifically are glycerol-based epoxy resins, glycerol being a naturally occurring and renewable compound that does not contain phenols.

BACKGROUND OF THE INVENTION

Epoxy resins were discovered in 1927 in the USA by Castan and Greenlee by utilizing the epoxy functional groups on biphenyls with various curing agents. The term 'epoxy resin' is often used to refer to both an original, uncured composition (a precursor composition) containing monomers with an epoxide functional group, as well as to a cured final product (a cured resin) with various levels of polymerisation.

Epoxy resins have broad application in industry including as adhesives, structural composites, electronic circuit boards, electrical products, sporting equipment, packaging, flooring and coatings. Commercially available epoxy resins are generally made from petroleum based compounds such as bisphenol A (BPA), a synthetic compound derived from fossil fuels. Bisphenols are a group of compounds with two hydroxyl phenyls and a reactant such as acetone, formaldehyde, and sulphur trioxide. These products are called bisphenol A, bisphenol F and bisphenol S respectively.

Bisphenols in particular have come to the attention of the US Food and Drug Administration (FDA) and the European Food Safety Authority (EFSA) because of concerns that they may be endocrine disruptors. This is particularly significant with resins such as bisphenol F and bisphenol A resins which come into contact with food, as a common coating on metal cans and/or as a common component of polycarbonate plastic bottles.

SUMMARY OF THE INVENTION

Biodiesel production has been increasing substantially world-wide over the last 30 years, biodiesel being a long chain fatty ester, with the consequence of there also being an increasing production of the by-product glycerol (propan-1, 2,3-triol). One mole of glycerol is produced for every three moles of biodiesel, and it has been reported that up to 1 million tonnes per year of glycerol is being produced as a waste product of biodiesel production, the glycerol often being incinerated in order to dispose of it, creating yet another unnecessary source of $CO_2$ in the atmosphere.

The present inventors have determined that it would be useful to be able to use the excess glycerol to develop epoxy resins that do not contain bisphenols, yet have acceptable properties so as to be able to replace, and be as commercially useful as, bisphenol-based epoxy resins.

The present invention thus provides an aliphatic epoxy resin precursor composition containing an epoxy component and, optionally, a reactive component, the composition containing no bisphenols, wherein the epoxy component is a glycerol-based ether, and wherein the precursor composition contains greater than about 60% (w/w) of the epoxy component and between 0% and 30% (w/w) of the reactive component.

Epoxy resin precursor compositions are low molecular weight pre-polymers which normally contain at least two epoxide groups, the pre-polymers typically being a system of monomers that have been at least partially reacted to an intermediate molecular weight state. Such compositions are then capable of further polymerisation to a fully cured high molecular weight state. Due to common naming confusion where the term "epoxy resin" is often used to describe both the liquid precursor composition (prior to curing) and the solid resin after curing, in this specification the terms "aliphatic epoxy resin precursor composition" and "cured aliphatic epoxy resin" are used to distinguish between the two different states.

The term "aliphatic" is used herein to mean the epoxy component is typically formed by glycidylation of aliphatic alcohols or polyols, and is not principally derived from phenol or substituted phenol compounds (e.g., phenyl phenol, butyl phenol, nonyl phenol, cresol, bisphenol A, bisphenol F, butoxymethylolated bisphenol A, novolac phenolics, resoles phenolics, and the like). An aliphatic epoxy resin precursor composition, with open chains of carbon atoms, is distinguishable from an aromatic composition with closed ring carbon chains such as phenols. Indeed, in the present invention, the epoxy component is a glycerol-based ether so that neither the precursor composition nor the cured resin contain need to contain, nor do contain, any phenols.

In a preferred form of the present invention, the glycerol-based ether is a glycerol glycidyl ether such as one or more ethers selected from the group including glycerol diglycidyl ether, glycerol triglycidyl ether and diglycerol triglycidyl ether. Preferably the glycerol-based ether is glycerol triglycidyl ether, which offers stronger cross-linking, higher viscosities and better performance overall.

A reactive component in an aliphatic epoxy resin precursor composition is often referred to as a hardener or a curative, and the cross-linking reaction initiated by the reactive component is commonly referred to as curing, even though in a pre-cursor composition these cross-linking reactions do not completely polymerise and cure the composition.

In a preferred form, a reactive component will be present in the precursor composition, and the reactive component can be one of more of a wide range of components including polyfunctional amines, acids (and acid anhydrides), phenols, alcohols and thiols. In a preferred form, the reactive component is an amine-based component, such as a diamine-based component.

In a preferred form, the preferred reactive component may be selected from aliphatic, cycloaliphatic or arylaliphatic diamines, such as ethylene diamine, 1,2-propane diamine, 1,3-propane diamine, 2-methyl-1,2-propane diamine, 2,2-dimethyl-1,3-propane diamine, 1,3-butane diamine, 1,4-butane diamine, 1,3-pentane diamine (DAMP), 1,5-pentane diamine, 1,5-diamino-2-methylpentane (MPMD), 2-butyl-2-ethyl-1,5-pentane diamine (C11-Neodiamine), 1,6-hexane diamine, 2,5-dimethyl-1,6-hexane diamine, 2,2,4- and 2,4,4-trimethylhexamethylene diamine (TMD), 1,7-heptane diamine, 1,8-octane diamine, 1,9-nonane diamine, 1,10-decane diamine, 1,11-undecane diamine, 1,12-dodecane diamine, 1,2-, 1,3- and 1,4-diaminocyclohexane, bis-(4-aminocyclohexyl)methane (H.sub.12-MDA), bis-(4-amino-3-methylcyclohexyl)methane, bis-(4-amino-3-ethylcyclohexyl)methane, bis-(4-amino-3,5-dimethylcyclohexyl)methane, bis-(4-amino-3-ethyl-5-methylcyclohexyl)methane (M-MECA), 1-amino-3-aminomethyl-3,5,5-trimethylcyclohexane (isophorone diamine or IPD), 2- and 4-methyl-1,3-diaminocyclohexane and mixtures thereof, 1,3- and 1,4-bis-(amino-methyl)cyclohexane, 2,5(2,6)-bis-(aminomethyl)bicyclo[2.2.1]heptane (NBDA), 3(4), 8(9)-bis- (aminomethyl)tricyclo[5.2.1.0.sup.2,6]decane, 1,4-diamino-2,2,6-trimethylcyclohexane (TMCDA), 1,8-menthane diamine, 3,9-bis-(3-aminopropyl)-2,4,8,10-tetraoxaspiro[5.5]undecane as well as 1,3- and 1,4-bis-(aminomethyl)benzene.

In a most preferred form, the reactive component will be 1-amino-3-aminomethyl-3,5,5-trimethylcyclohexane (isophorone diamine or IPD). In this respect, the structure of IPD is rigid and tends to form a stronger epoxy resin on curing due to stronger crosslinking. Additionally, the IPD is non-yellowing, which is often a desirable property.

As mentioned above, the amount of the epoxy component in the precursor composition is greater than about 60% (w/w). At levels below 60% (w/w), it has been found that cured epoxy resin does not harden to an acceptable extent and will sometimes only form an unstable rubbery substance.

As also mentioned above, the amount of the reactive component in the precursor composition is between 0% and 30% (w/w), meaning that in the broadest form the reactive component is optional in the precursor composition. However, in most preferred forms of the precursor composition, reactive component will be present and will be present in an amount of between 1% and 30% (w/w). In some forms, the amount of the reactive component in the precursor composition will be between 1% and 5% (w/w), or between 1% and 3% (w/w), or between 3% and 5% (w/w), or between 3% and 10% (w/w), or about 5% (w/w). In these forms, the amount of the epoxy component in the precursor composition will be in the range of between 60% to 99% (w/w)

It has been found that by controlling the amount of the reactive component in the preferred form of the precursor composition, it is possible to improve the viscosity of the pre-cured epoxy resin (assisting with its application to, for example, vertical surfaces) and reduce the heat of reaction of the epoxy resin on curing. This provides additional benefits over and above the exclusion of the phenols (as outlined above). It has also been found that if more than 30% of the reactive component is added to the precursor composition, the precursor composition may become too viscous to use.

The present invention thus also provides a cured aliphatic epoxy resin containing a precursor composition and a curing component, the precursor composition including an epoxy component and, optionally, a reactive component, and the cured resin containing no bisphenols, wherein the epoxy component is a glycerol-based ether, and wherein the precursor composition contains greater than about 60% (w/w) of the epoxy component and between 0% and 30% (w/w) of the reactive component.

A curing component for use with a precursor composition to form a cured aliphatic epoxy resin is functionally the same type of component as the component referred to above as a "reactive component". A curing component is also often referred to as a hardener or a curative, and the cross-linking reaction initiated by the curing component is also commonly referred to as curing or simply as polymerisation. Curing components are again traditionally one of more of a wide range of components including polyfunctional amines, acids (and acid anhydrides), phenols, alcohols and thiols.

In the present invention, the curing component is also preferably an amine-based component, such as a diamine-based component, but need not be. The curing component may thus also be one of the aliphatic, cycloaliphatic or arylaliphatic diamines mentioned above and, again, may be 1-amino-3-aminomethyl-3,5,5-trimethylcyclohexane (isophorone diamine or IPD).

In a preferred form, the cured resin contains between about 15% and 40% (w/w) of the reactive component and the curing component combined, or more preferably is between about 20% and 40% (w/w) of the reactive component and the curing component combined, or more preferably is between about 20% and 25% (w/w) of the reactive component and the curing component combined.

Finally, the epoxy resin precursor composition may also be blended with at least one additive including, for example, a cure accelerator and/or retardant, a solvent or diluent, a modifier such as a flow modifier and/or a thickener, a reinforcing agent, a filler, a pigment, a dye, a mold release agent, a wetting agent, a stabilizer, a heat or fire retardant agent, a surfactant, an anti-fouling agent, an anti-rust agent, or any combination thereof. The additive may be blended during formation of the precursor composition or may be blended with the precursor composition upon formation of the cured epoxy resin.

The additives may be added in functionally equivalent amounts, for example, the pigment and/or dye may be added in quantities which will provide the composition with the desired colour. In general, the amount of the additives may be from about 0% to about 30% (w/w), based upon the weight of the cured epoxy resin.

A cured aliphatic epoxy resin in accordance with the present invention can advantageously be used as a fibre composite, a casting compound, a sealant, an adhesive, a covering, a coating, a protective paint, a seal, a base coat or a primer. For example, the resin can be used as an autobody adhesive, a sandwich element adhesive, a base coat and primer for construction and industrial uses, such as a floor covering or floor coating for interior spaces such as offices, industrial halls or gyms, or for outdoor purposes such as balconies, terraces or roofs, or as a protective coating for concrete, cement, metals, polymers or wood, such as for sealing the surfaces of wood constructions, vehicles, loading surfaces, tanks, silos, shafts, tubes or pipelines, wherein these coatings protect the respective substrates in particular from corrosion, abrasion, moisture, effects of water and/or salt or chemicals, and furthermore as a prime coat, adhesive coat, anti-fouling agent, or anti-corrosive primer, or for hydrophobing surfaces.

In summary, and without wishing to be bound by theory, the polymerisation chemistry of a glycerol-based epoxy component such as glycerol triglycidyl ether (GTE) involves the nucleophilic attack of an amine onto the methylene carbon of the epoxide ring, giving rise to an open ring product that reacts with an epoxide ring of a different molecule. This is repeated until all the epoxy groups have ring-opened, leading to a completely cross-linked structure in the cured epoxy resin.

The addition of the curing component to the epoxy resin precursor composition starts the cross linking process. In the present invention, this reduces the heat generated by the exothermic reaction and provides a more viscous product. This allows the epoxy resin to be applied more easily and avoids the risk of heat damage during application. The aliphatic building block prevents the cured epoxy resin from yellowing in sunlight, a desirable quality for aesthetic applications. Using molecules predominantly derived from glycerol makes this a 'green' or 'low carbon emission' product. Finally, there are no phenol based compounds such as BPA in the final product, avoiding the current concerns on health issues as identified by the European and American Health Agencies and more importantly for users, eliminates most of the odour issues associated with phenol based and solvent modified epoxy resins.

DETAILED DESCRIPTION OF PREFERRED EMBODIMENTS

The present invention will now be described by way of several worked examples of embodiments in accordance with the present invention. The following description is not to limit the generality of the above description.

Example 1

In this example, an epoxy component in the form of glycerol triglycidyl ether (GTE) was used to form a fully crossed linked and cured epoxy resin. Isophorone diamine (IPD) was used as both the reactive component and the curing component as it advantageously reacts slower and therefore was found to be more suited to larger scale industrial applications.

100 g of 0.59 mol isophorone diamine (IPD) was added carefully to 2000 g of 7.69 mol glycerol triglycidyl ether (GTE) and stirred with a mechanical stirrer on medium for 1 hour followed by stirring overnight on a low setting. The precursor composition produced by this reaction was viscous and clear with a light-yellow tinge in appearance.

The precursor composition was placed in an appropriate dry container ready for further blending with additives. In this respect, the stored precursor composition is able to be formulated as required depending on the final application. Various additives can be added to impart different properties.

A portion of the precursor composition was then modified by being blended with additives. Pigment (10 g, 7.2 parts) was added portion wise into a stirred mixture of 100 g (71.9 parts) of the precursor composition and stirred for 5 minutes. Talc (9 g, 6.5 parts), silica flour (16.0 g, 11.5 parts) and Aerosil 200 [hydrophilic fumed silica] (4.03 g, 2.9 parts) were added in a similar fashion with 10 minute breaks between each additive. The resulting blended precursor composition was stirred for 5 hours at 1200 to 1000 revolutions per minute. Stirring was deemed complete after spreading a thin layer over glass, and checking for uniformity of the additives. The blended precursor composition was then stored until ready for use.

In this example, further isophorone diamine (1.9g) was used as a curing component to form a cured aliphatic epoxy resin and was rapidly and thoroughly mixed into 10.25 g of the blended precursor composition, and rapidly mixed for 3 to 4 minutes. The resultant epoxy resin was applied to a timber surface using a paint brush and allowed to cure. The coating was tacky within 3 hours and cured within 6 hours, with optimum curing and strength achieved after 24 hours. Curing time can be fast tracked by curing in an oven.

The amount of the IPD curing component required to achieve a fully crosslinked molecular structure in the cured epoxy resin would usually be based on an epoxy equivalent weight (EEW) calculation. However, in the present example, NMR was used instead of a traditional titration analysis to determine the amount of curing component required.

Example 2—Formation of Cured Disks for Testing

Cured disks were prepared using Araldite™ and Megapoxy™ for purposes of comparison with the cured epoxy resin of the present invention. Araldite™ liquids were dispensed from two tubes into a plastic cup, mixed and allowed to cure, while Megapoxy™ liquids were mixed in a 2:1 (w/w) ratio and also allowed to cure in a cup.

For comparison, 10 g of the precursor composition (pre-blending) prepared in Example 1 had 3.13 g of IPD added to it as a curing component, and the subsequent epoxy resin of the present invention was cured in a plastic cup to form a clear, cured epoxy resin. After further curing in an oven at 80° C. for 4 hours, strips of each of the Araldite™, Megapoxy™ and GTE/IPD resin were prepared for testing purposes.

Example 3—Formation of Cured Cylinders for Testing

Clear polymer cylinders were made in the same manner as described in paragraph [0035] above for hardness testing and for comparison to a commercial BPA epoxy resin product. The hardness results showed that the BPA epoxy resin product was 31 MPa compared to epoxy resin blocks in accordance with the present invention of 68 to 77 MPa.

Example 4—Coating With Clear Epoxy Resin for Testing

A clear precursor composition was made by mixing 50 g of IPD with 1000 g of GTE and stored for two weeks. Prior to application as a coating to flooring, 250 g of IPD was added to the precursor composition and thoroughly stirred. The resulting mixture was applied to an exposed aggregate concrete floor with a squeegee and allowed to harden. A clear glossy finish was achieved.

Two weeks later, and without pre-preparation, a second coating was applied adjacent to the hardened first application. Again, a clear glossy finish was achieved with no noticeable join between the first and second applications.

Example 5—Application of the Epoxy Resin (Tinted) for Flooring

Pigment (10 g, 7.2 parts) was added portion wise into a stirred mixture of precursor composition (100 g, 71.9 parts) and stirred for 5 minutes. Talc (9 g, 6.5 parts), Silica flour (16.0 g, 11.5 parts) and Aerosil 200 (4.03 g, 2.9 parts) were added in a similar fashion with 10 minute breaks between each additive. The resulting mixture was stirred for 5 hours at 1200-1000 revolutions per minute. Stirring was deemed complete after spreading a thin layer over glass, checking for uniformity of the additives. The precursor composition was then stored until ready for use.

When application was eventually required, IPD (30 g) was applied to the formulation described in Example 1 and rapidly mixed. The mixture was then applied with a paint brush to various materials. The applications tested four different dyes white, ochre, black and grey (a combination of white and black dyes), which were applied to timber resulting in a very hard, high gloss finish. A UV lamp test was conducted for 48 hours on the white dyed epoxy applied as a coating on timber. This test showed initial darkening and returned to standard white colour within a few hours, which was determined to be not due to resin but the titanium oxide dye.

Finally, other modifications and improvements may also be made to the compositions and resins described above without departing from the scope of the present invention.

The invention claimed is:

1. An aliphatic epoxy resin precursor composition comprising:
   an epoxy resin precursor comprising a pre-cured, at least partially reacted, but not completely polymerized or cured, mixture of (i) an epoxy component comprising a glycerol glycidyl ether and (ii) a reactive component comprising 1-amino-3-aminomethyl-3,5,5-trimethyl-cyclohexane (isophorone diamine or IPD), the mixture containing free epoxide groups;
   wherein:
      the precursor composition contains no bisphenol-based epoxy resins;
      the precursor composition contains greater than about 60% (w/w) of the epoxy component in reacted and unreacted forms combined and relative to the precursor composition; and
      the precursor composition contains between 1% and 10% (w/w) of the reactive component in reacted and unreacted forms combined and relative to the precursor composition.

2. The precursor composition according to claim 1, wherein:
   the glycerol glycidyl ether is formed by glycidylation of one or both of glycerol and diglycerol, and is not derived from phenol or substituted phenol compounds.

3. The precursor composition according to claim 1, wherein the glycerol glycidyl ether is selected from the group consisting of glycerol diglycidyl ether, glycerol triglycidyl ether, diglycerol triglycidyl ether, and combinations thereof.

4. The precursor composition according to claim 1, wherein:
   the precursor composition contains greater than 60% and up to 99% (w/w) of the epoxy component in reacted and unreacted forms combined relative to the precursor composition;
   the precursor composition contains between 1% and 5% (w/w) of the reactive component in reacted and unreacted forms combined relative to the precursor composition; and
   the precursor composition is in a liquid form and remains not completely polymerized or cured for a storage period of two weeks.

5. The precursor composition according to claim 1, wherein the precursor composition contains between 1% and 3% (w/w) of the reactive component in reacted and unreacted forms combined relative to the precursor composition.

6. The precursor composition according to claim 1, further comprising:
   at least one additive blended with the epoxy resin precursor, the at least one additive being selected from the group consisting of a cure accelerator, a solvent or diluent, a flow modifier and/or a thickener, a reinforcing agent, a filler, a pigment, a dye, a mold release agent, a wetting agent, a stabilizer, a heat or fire retardant agent, or a surfactant, and combinations thereof.

7. A method for forming a cured aliphatic epoxy resin, the method comprising:
   adding a curing component to the aliphatic epoxy resin precursor composition of claim 1, wherein the curing component comprises at least one of a polyfunctional amine, an acid, an acid anhydride, a phenol, an alcohol, and a thiol; and
   curing and completely cross-linking the curing component and the epoxy resin precursor, thereby forming the cured aliphatic epoxy resin.

8. The method of claim 7, wherein:
   the glycerol glycidyl ether is selected from the group consisting of glycerol diglycidyl ether, glycerol triglycidyl ether, diglycerol triglycidyl ether, and combinations thereof;
   the curing component comprises the polyfunctional amine, which is selected from the group consisting of aliphatic diamines, cycloaliphatic diamines, arylaliphatic diamines, and combinations thereof; and
   the curing component is added to the aliphatic epoxy resin precursor composition in an amount such that the cured aliphatic epoxy resin contains between 15% and 40% (w/w) of the reactive component and the curing component combined in reacted form and relative to the cured aliphatic epoxy resin.

9. The method of claim 7, further comprising:
   adding at least one additive to the curing component the aliphatic epoxy resin precursor composition, the additive being selected from the group consisting of a cure accelerator, a solvent or diluent, a flow modifier and/or a thickener, a reinforcing agent, a filler, a pigment, a dye, a mold release agent, a wetting agent, a stabilizer, a fire retardant agent, or a surfactant, and combinations thereof.

10. The method of claim 9, wherein the at least one additive is added in an amount from about 0.5% to about 30% (w/w) relative to the cured aliphatic epoxy resin.

11. A curable aliphatic epoxy resin composition comprising:
   the aliphatic epoxy resin precursor composition of claim 1; and
   a curing component comprising at least one of a polyfunctional amine, an acid, an acid anhydride, a phenol, an alcohol and a thiol, wherein the curing compound is in an amount sufficient to completely cross-link and cure the epoxy resin precursor when combined with the aliphatic epoxy resin precursor composition.

12. The method of to claim 9, wherein the at least one additive is added in an amount from about 0.5% to about 5% (w/w) relative to the cured aliphatic epoxy resin.

13. The method of claim 9, wherein the at least one additive is added in an amount from about 0.5% (w/w) to about 3% (w/w) relative to the cured aliphatic epoxy resin.

14. The method of claim 9, further comprising:
   applying the curing component and the aliphatic epoxy resin precursor composition to a substrate such that subsequent curing and cross-linking forms the cured aliphatic epoxy resin as a coating on the substrate.

15. The curable aliphatic epoxy resin of claim 11, wherein:
   the glycerol glycidyl ether is selected from the group consisting of glycerol diglycidyl ether, glycerol triglycidyl ether, diglycerol triglycidyl ether, and combinations thereof;
   the curing component comprises the polyfunctional amine, which is selected from the group consisting of aliphatic diamines, cycloaliphatic diamines, arylaliphatic diamines, and combinations thereof; and
   the amount of the curing component is such that a cured aliphatic epoxy resin resulting between the curing component and the epoxy resin precursor contains between 15% and 40% (w/w) of the reactive component and the curing component combined in reacted form and relative to the cured aliphatic epoxy resin.

16. The curable aliphatic epoxy resin of claim 11, wherein the amount of the curing component is such that a cured aliphatic epoxy resin resulting between the curing component and the epoxy resin precursor contains between 15% and 40% (w/w) of the reactive component and the curing component combined in reacted form and relative to the cured aliphatic epoxy resin.

17. The method of claim 7, wherein the curing component is added to the aliphatic epoxy resin precursor composition in an amount such that the cured aliphatic epoxy resin contains between 15% and 40% (w/w) of the reactive component and the curing component combined in reacted form and relative to the cured aliphatic epoxy resin.

\* \* \* \* \*